하지 않음

(12) United States Patent
Mochida (10) Patent No.: US 10,720,803 B2
(45) Date of Patent: Jul. 21, 2020

(54) ROTATING ELECTRICAL MACHINE WITH ROTOR HAVING PLURALITY OF UMBRELLA FORM PORTIONS AND RADIATING PROJECTIONS IN BETWEEN

(71) Applicant: FUJI ELECTRIC CO., LTD., Kawasaki-shi, Kanagawa (JP)

(72) Inventor: Toshiharu Mochida, Suzuka (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 894 days.

(21) Appl. No.: 15/231,828

(22) Filed: Aug. 9, 2016

(65) Prior Publication Data

US 2016/0352162 A1    Dec. 1, 2016

Related U.S. Application Data

(63) Continuation of application No. PCT/JP2014/071253, filed on Aug. 11, 2014.

(51) Int. Cl.
*H02K 1/27* (2006.01)
*H02K 21/14* (2006.01)
*H02K 15/03* (2006.01)

(52) U.S. Cl.
CPC ............ *H02K 1/274* (2013.01); *H02K 1/276* (2013.01); *H02K 15/03* (2013.01); *H02K 21/14* (2013.01); *H02K 2213/03* (2013.01)

(58) Field of Classification Search
CPC .... H02K 1/274; H02K 1/2746; H02K 1/2753; H02K 1/276; H02K 1/2766; H02K 1/2733; H02K 1/278; H02K 1/28; H02K 1/30; H02K 21/14; H02K 2213/03

USPC .......... 310/156.38, 156.39, 156.44, 156.46, 310/156.11, 156.57, 156.56, 156.53, 310/156.83, 156.58

See application file for complete search history.

(56) References Cited

U.S. PATENT DOCUMENTS

| 5,844,344 | A |  | 12/1998 | Uetake et al. |
| 6,034,458 | A | * | 3/2000 | Uetake .................. H02K 21/14 310/156.49 |

(Continued)

FOREIGN PATENT DOCUMENTS

| CN | 102957239 A | 3/2013 |
| CN | 103004057 A | 3/2013 |

(Continued)

*Primary Examiner* — Maged M Almawri
(74) *Attorney, Agent, or Firm* — Rabin & Berdo, P.C.

(57) ABSTRACT

A multiple of communication hole pairs each including two communication holes are formed in a rotor in a rotor rotation direction. A region between the two communication holes of each communication hole pair is a center bridge that connects a core portion of the rotor and an umbrella form portion on an outer side in the rotor radial direction, and each communication hole communicates with an outer periphery of the rotor. A multiple of radiating projections protrude in the rotor radial direction from a central axis of rotation between respective pairs of the communication hole pairs. The radiating projections have side surface projections protruding to the umbrella form portion side neighboring in the rotor rotation direction. The side surface projections cover a whole or one portion of the umbrella form portion from the outer peripheral side of the rotor.

24 Claims, 5 Drawing Sheets

(56) References Cited

U.S. PATENT DOCUMENTS

| | | | | |
|---|---|---|---|---|
| 6,472,789 B1* | 10/2002 | Akemakou | H02K 21/042 | 310/156.49 |
| 6,741,003 B2* | 5/2004 | Naito | H02K 1/2766 | 310/156.48 |
| 6,940,199 B2* | 9/2005 | Imamura | H02K 1/278 | 310/156.01 |
| 8,502,430 B2* | 8/2013 | Yamada | H02K 1/2746 | 310/156.53 |
| 8,766,468 B1* | 7/2014 | Rilla | B60L 3/0023 | 290/45 |
| 9,041,268 B2* | 5/2015 | Tomohara | H02K 1/2766 | 310/156.53 |
| 9,397,526 B2* | 7/2016 | Akasako | H02K 1/278 | |
| 9,748,806 B2* | 8/2017 | Koka | B60L 50/51 | |
| 10,348,144 B2* | 7/2019 | Oketani | H02K 1/2766 | |
| 2005/0110356 A1* | 5/2005 | Imamura | H02K 1/278 | 310/156.53 |
| 2009/0224624 A1* | 9/2009 | Kumar | H02K 1/246 | 310/156.53 |
| 2009/0224627 A1* | 9/2009 | Hino | H02K 1/276 | 310/216.077 |
| 2011/0062815 A1* | 3/2011 | Aota | H02K 1/276 | 310/156.53 |
| 2012/0074801 A1* | 3/2012 | Brown | H02K 1/2766 | 310/59 |
| 2012/0112592 A1* | 5/2012 | Yamada | H02K 1/2746 | 310/156.53 |
| 2012/0248915 A1* | 10/2012 | Kagami | H02K 1/2766 | 310/156.01 |
| 2013/0043757 A1* | 2/2013 | Kagami | H02K 1/2766 | 310/156.53 |
| 2013/0119812 A1* | 5/2013 | Takizawa | H02K 1/276 | 310/156.53 |
| 2013/0307363 A1* | 11/2013 | Sano | H02K 1/2766 | 310/156.01 |
| 2014/0184009 A1* | 7/2014 | Taniguchi | H02K 1/2746 | 310/156.53 |
| 2014/0217848 A1* | 8/2014 | Jurkovic | H02K 1/2766 | 310/156.53 |
| 2014/0252903 A1* | 9/2014 | Rahman | H02K 1/02 | 310/156.53 |
| 2015/0229170 A1* | 8/2015 | Koechlin | H02K 1/2766 | 310/156.53 |
| 2015/0318744 A1* | 11/2015 | Ekin | H02K 1/2773 | 310/156.56 |
| 2017/0040854 A1* | 2/2017 | Saint-Michel | H02K 3/12 | |

FOREIGN PATENT DOCUMENTS

| | | |
|---|---|---|
| EP | 2602911 A1 | 6/2013 |
| EP | 2733807 A2 | 5/2014 |
| JP | H08-331823 A | 12/1996 |
| JP | 5030794 B2 | 9/2012 |
| JP | 2013-046421 A | 3/2013 |
| JP | 2014-079068 A | 5/2014 |
| JP | 2014-103748 A | 6/2014 |
| WO | WO-2007/080888 A1 | 7/2007 |
| WO | WO-2012/014836 A1 | 2/2012 |

* cited by examiner

ROTATING ELECTRICAL MACHINE WITH ROTOR HAVING PLURALITY OF UMBRELLA FORM PORTIONS AND RADIATING PROJECTIONS IN BETWEEN

This application is a continuation under 35 U.S.C. 120 of International Application PCT/JP2014/071253 having the International Filing Date of Aug. 11, 2014, which is fully incorporated herein by reference.

TECHNICAL FIELD

The present invention relates to a rotating electrical machine having a rotor, such as a motor or generator.

BACKGROUND ART

Figure 6:
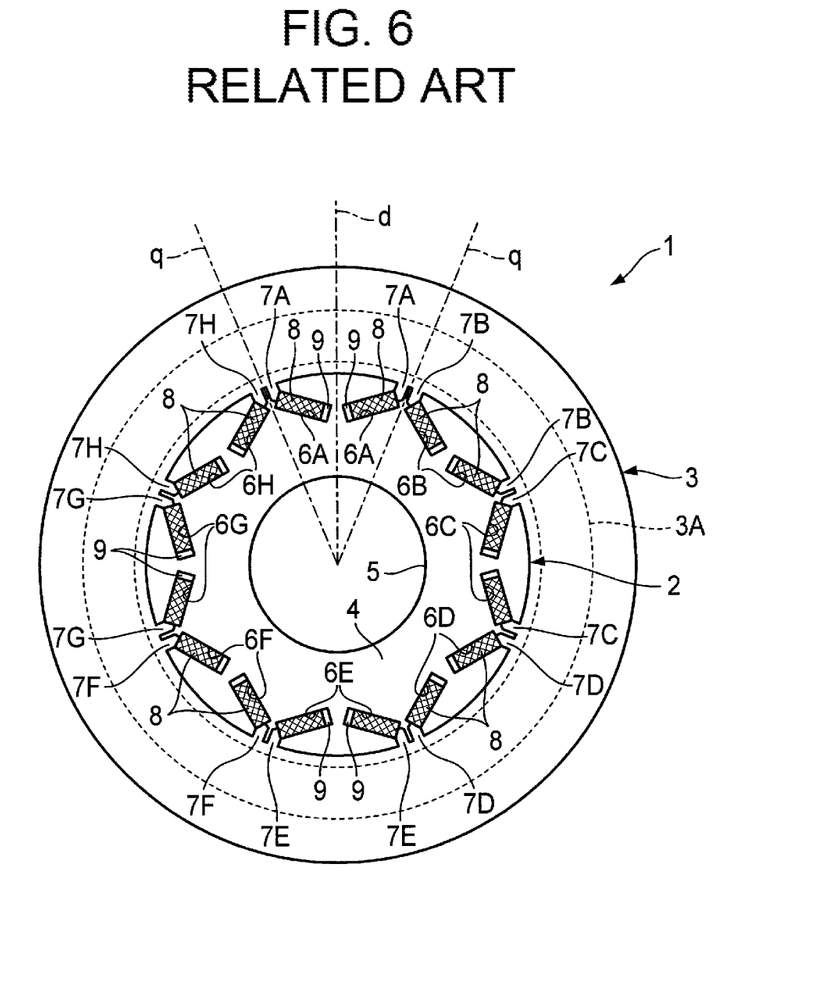
FIG. 6 is a lateral sectional view showing a configuration of an existing permanent magnet embedded type motor.
Figure 7:
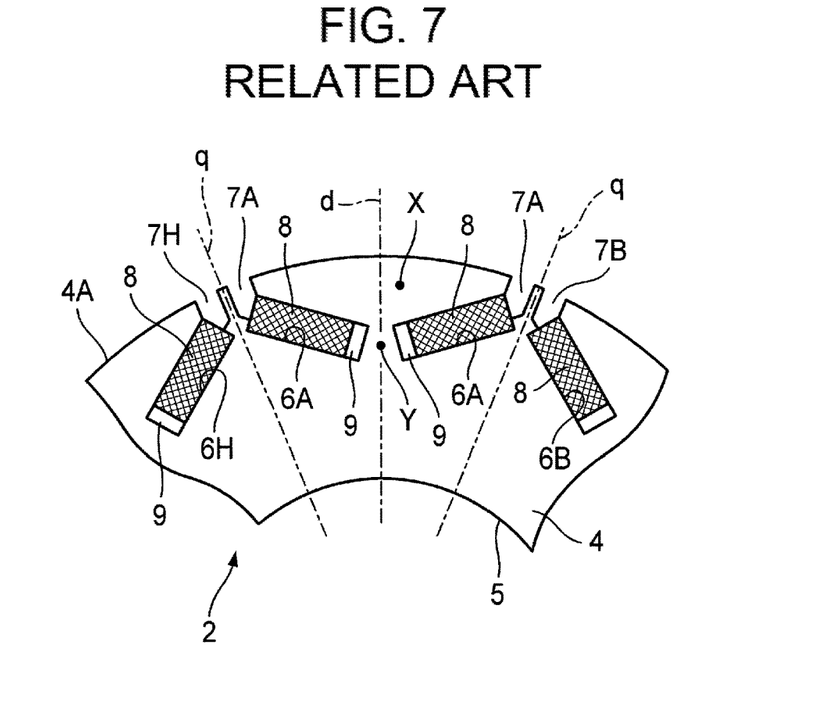
FIG. 7 is a lateral sectional view showing a configuration of a rotor of the same permanent magnet embedded type motor.
Figure 8:
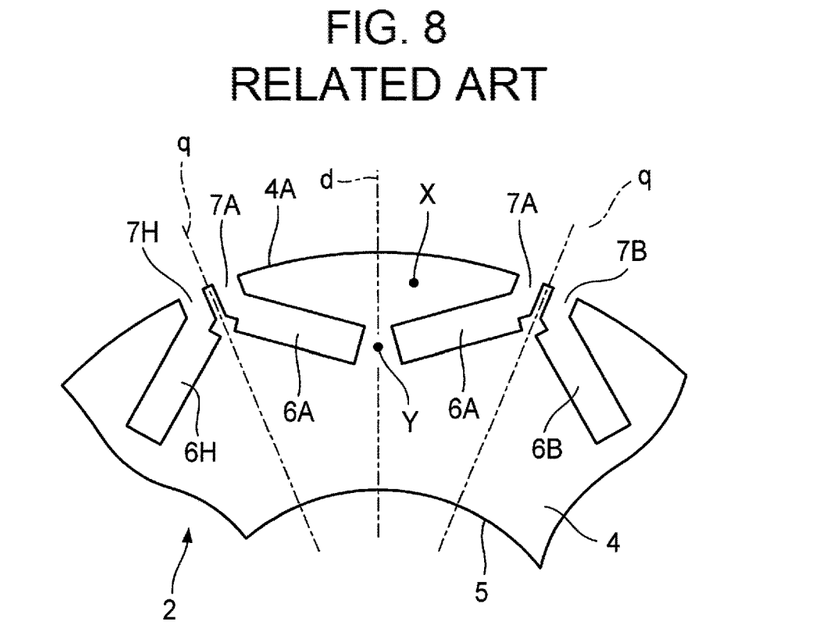
FIG. 8 is a lateral sectional view showing a configuration of the rotor of the same permanent magnet embedded type motor.

FIG. 6 is a sectional view showing a configuration of an existing permanent magnet embedded type motor 1. Also, FIG. 7 and FIG. 8 are sectional views showing a configuration of a rotor 2 of the permanent magnet embedded type motor 1. Herein, FIG. 7 shows a state in which a permanent magnet 8 is inserted into a magnet insertion hole 6A or the like, while FIG. 8 shows a state in which the magnet 8 is not inserted into the magnet insertion hole 6A or the like. The permanent magnet embedded type motor 1 includes the rotor 2 and a stator 3 disposed on an outer periphery of the rotor 2. A rotor core 4 configuring the rotor 2 is configured by stacking multiple steel plates formed of a magnetic body. Also, a rotating shaft (not shown) is inserted into a shaft hole 5 formed in the center of the rotor core 4, and fixed using appropriate means such as press fitting or bonding. A coil (not shown) is wound around the stator 3.

Two magnet insertion holes 6A are disposed in the steel plate configuring the rotor core 4, as shown in FIG. 8, drilled so as to spread in a V-shape toward an outer edge 4A of the steel plate. Two cutout holes 7A, extended in a form bending to a d axis side to be described hereafter from each of the magnet insertion holes 6A and communicating with the outer edge 4A of the steel plate, are drilled in positions on the outer edge 4A side that form q axis side end portions to be described hereafter in the two magnet insertion holes 6A disposed in a V-shape.

The two magnet insertion holes 6A and the two cutout holes 7A are provided as a pair, and eight pairs the same as the pair of magnet insertion holes 6A and cutout holes 7A are disposed in the steel plate so as to be distributed evenly. In FIG. 6, the magnet insertion holes of each pair are shown as 6A to 6H, and the cutout holes as 7A to 7H. Consequently, the rotor core 4 is configured by stacking multiple steel plates of identical structures in which eight pairs of the magnet insertion holes 6A to 6H and cutout holes 7A to 7H are drilled.

The permanent magnet 8, which is of a flat plate form configured of a rare earth type magnet such as a neodymium magnet, is inserted into and embedded in the magnet insertion holes 6A to 6H of each pair so that identical poles in each pair oppose each other. The two permanent magnets 8 embedded in the pair of magnet insertion holes 6A configure one pole as a pair, and eight pairs of permanent magnets 8 are embedded in the rotor core 4, whereby eight poles are formed. Not being limited to a rare earth type magnet, another magnet such as an alloy magnet or ferrite magnet may be used as the permanent magnet 8. Also, the permanent magnet 8 may be of a plate form having a curved cross-section in the direction of the axis of rotation. A d axis and q axis are set in this kind of magnet embedded type electric motor, as shown in FIG. 6 to FIG. 8.

The configuration wherein the pair of cutout holes 7A are formed by the pair of magnet insertion holes 6A being extended has an advantage in that magnet flux leakage between the pair of permanent magnets 8 and the neighboring permanent magnets 8 having different magnetic poles is restricted. The configuration wherein the pair of cutout holes 7A bend to the d axis side from the pair of magnet insertion holes 6A and communicate with the outer edge 4A of the steel plate is such that the area of a core region X can be reduced as far as possible in comparison with that of a configuration wherein the pair of cutout holes 7A are formed on an extensions of straight lines from the pair of magnet insertion holes 6A. Therefore, the centrifugal force of the core region X is reduced, and stress acting on a center bridge Y, to be described hereafter, can be reduced.

Meanwhile, the core region X divided by the formation of the cutout hole 7A (the same applies to the cutout holes 7B to 7H of the other pairs) is supported by the center bridge Y, which is a core region existing between the pair of magnet insertion holes 6A (the same applies to the magnet insertion holes 6B to 6H of the other pairs). Consequently, stress concentrates in the center bridge Y due to a load accompanying centrifugal force acting on the core region X when the rotor 2 rotates. Therefore, the center bridge Y is formed to have a constant width (dimension in a circumferential direction) that can withstand stress.

According to the existing example, as heretofore described, a permanent magnet embedded type rotating electrical machine that has superior rotor strength, can be manufactured at low cost, and with which a large torque is obtained, can be realized.

CITATION LIST

Patent Literature

PTL 1: JP-A-2013-046421

SUMMARY

However, the heretofore described existing technology has the following problems.

Firstly, the existing permanent magnet embedded type rotating electrical machine is such that windage loss is large.

In the existing permanent magnet embedded type rotating electrical machine, the cutout holes 7A to 7H open widely in an outer peripheral portion of the rotor, because of which air flow deviation is liable to occur in this vicinity. This is liable to cause large windage loss. This windage loss is a cause not only of output torque loss, but also of a rise in temperature.

Secondly, the existing permanent magnet embedded type rotating electrical machine is such that it is difficult to reduce the number of magnetic poles.

In the existing permanent magnet embedded type rotating electrical machine, the cutout holes 7A to 7H are all of equal size, because of which the magnetic resistances in the circumferential direction of the cut out hole 7A to 7H portions are all equal. This characteristic is convenient when one magnetic pole is formed with the two magnet insertion holes 6A and 6A, as in the existing example, but there is inconvenience when attempting to form one magnetic pole of a total of, for example, the four magnet insertion holes 6A, 6A, 6B, and 6B. Generally, the ideal form of a distribution of magnetomotive force in the rotor rotation direction is one sine wave in two magnetic poles, but in this case the distribution form is two sine waves in two magnetic poles. Of course, there is also a method whereby the actual numbers of the center bridge Y and the magnet insertion holes 6A to 6H are halved, but in this case the number of the magnet 8 is halved, because of which output torque is halved, leading to a considerable drop in performance. As a measure against this, there is also a method whereby the size of the magnet 8 is doubled, but in this case a centrifugal force of nearly twice the original acts on the center bridge Y, because of which the strength is insufficient.

Thirdly, a large amount of magnetic flux leaks through the center bridge Y.

Provided that leakage flux is reduced, the amount of magnetic flux contributing to output torque can be increased, even with the same number of magnets. Narrowing the center bridge Y is effective in reducing leakage flux, but this is difficult when the magnet insertion holes are disposed in the kind of V-shape of the existing example. An explanation of this will be given hereafter.

Generally, an interference fit such as a shrink fit is often used as a method of fixing the rotor core and shaft. When carrying out this interference fit, however, large tensile stress is generated in the circumferential direction in a concentric portion with no break (in other words, a portion connected in a ring form) centered on the central axis of the shaft. This circumferential direction tensile stress also remains after the fitting work, and is not released until the shaft is removed. Naturally, the stress still remains when the rotor and shaft are assembled as a motor, and while the rotor is rotating.

In the case of the kind of rotor core form of the existing example, a region in which the circumferential direction assembly residual tensile stress is generated is practically equivalent to the inner side of an inscribed circle of all the magnet insertion holes. A problem of the existing example is that this region (the inner side of the inscribed circle of all the magnet insertion holes) and the center bridge Y are in proximity. That is, while the rotor is rotating, stress caused by centrifugal force accompanying the rotation is additionally superimposed in the region in which assembly residual stress has already been generated, because of which the total stress is extremely high. It is necessary to widen the center bridge in order to secure the necessary strength sufficient to withstand the total stress. Therefore, the existing example is such that reducing leakage flux is difficult.

Fourthly, the magnetomotive force has a large number of higher harmonics, with a commensurate loss of fundamental wave components. That is, there is room for an increase in output torque. Generally, it is known that the higher harmonic components of magnetomotive force can be reduced, and fundamental wave components increased commensurately, by adjusting the radius of the outer peripheral surface of the rotor.

However, in the case of a normal rotor wherein the magnet holes do not communicate with the rotor outer peripheral surface, the vicinity of the rotor outer peripheral surface is from the outset a region in which assembly residual stress is generated, because of which adjusting the outer peripheral surface radius while avoiding stress concentration is difficult.

The invention, having been contrived considering the heretofore described kind of situation, has a first object of providing a rotating electrical machine such that windage loss can be restricted, and that has superior rotor strength. Also, a second object of the invention is to reduce the number of magnetic poles of the rotating electrical machine, thereby reducing drive frequency.

The invention provides a rotating electrical machine, including a multiple of communication hole pairs each including two communication holes each communicating with an outer periphery of a rotor, and formed in the rotor in a rotor rotation direction, wherein a region between the two communication holes configuring the communication hole pair is a center bridge that connects a core portion on an inner side in a rotor radial direction of the two communication holes in the rotor and an umbrella form portion on an outer side in the rotor radial direction, the two communication holes communicate with the outer periphery of the rotor on a side opposite to that of the center bridge, the rotor has a multiple of radiating projections protruding in the rotor radial direction from a rotational center of the rotor between the respective pairs of the multiple of pairs of communication holes, and at least one portion of the multiple of radiating projections has a side surface projection protruding to the umbrella form portion side neighboring in the rotor rotation direction.

In a preferred aspect, the rotating electrical machine is such that a form of at least one radiating projection of the plurality of radiating projections differs from a form of the other radiating projections.

Advantageous Effects of Invention

According to the invention, the outline of the outermost periphery of a rotor becomes a smooth outline with few breaks by a side surface projection being provided on a radiating projection, and windage loss can be restricted. Also, by the radiating projection form being caused to differ among a plurality of radiating projections, the distribution of magnetomotive force in a rotor rotation direction can be adjusted, and the number of magnetic poles formed in the rotor can be reduced.

DETAILED DESCRIPTION

Hereafter, referring to the drawings, embodiments of the invention will be described.

(Overall Configuration of Each Embodiment)

Figure 1:
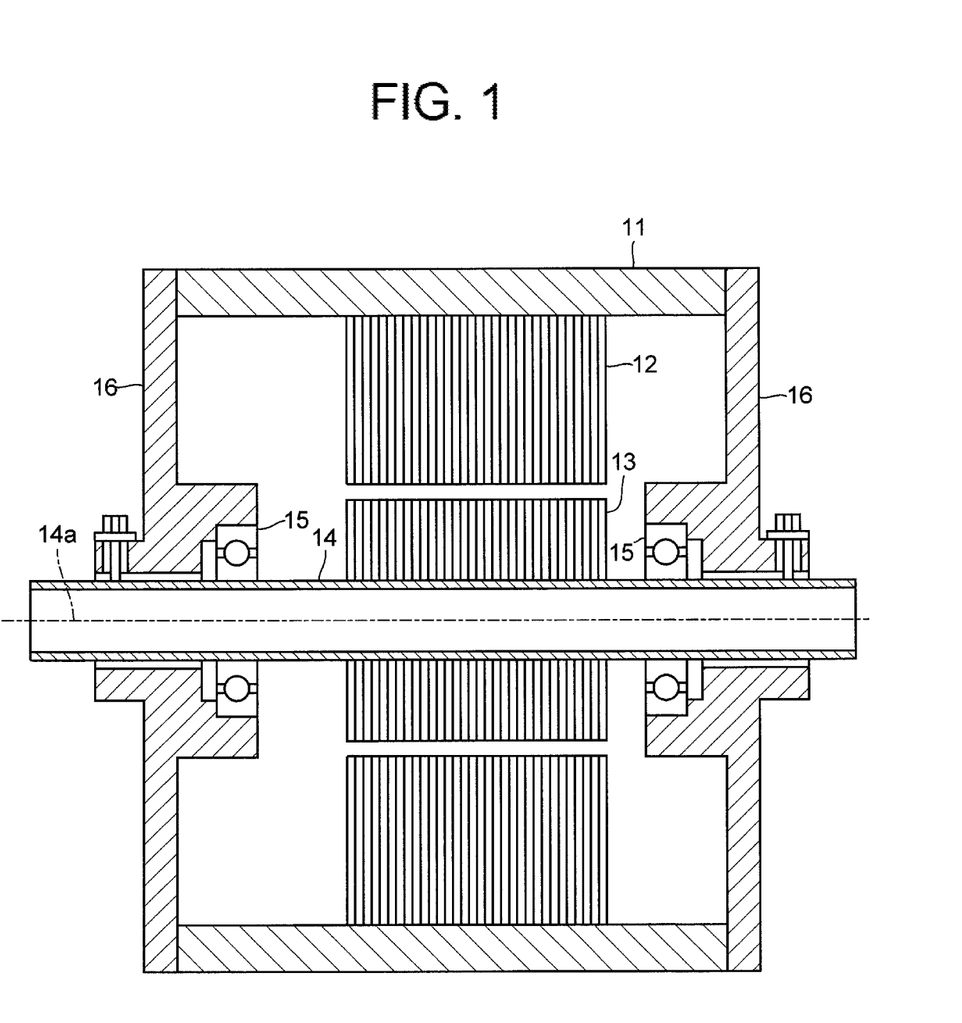
FIG. 1 is a vertical sectional view showing an overall configuration of a permanent magnet embedded type rotating electrical machine in each embodiment of the invention.

FIG. 1 is a vertical sectional view showing an overall configuration of a permanent magnet embedded type rotating electrical machine, which is each embodiment of the invention. In FIG. 1, a frame 11 is a housing that covers the whole of a permanent magnet embedded type rotating electrical machine, and is configured of iron, aluminum, stainless steel, or the like. A stator 12 of a hollow cylindrical form is provided on the inner side of the frame 11.

The stator 12 is formed by stacking silicon steel plates. A hole is provided in the stator 12, and a stator winding formed of copper wire or the like is inserted through the hole (omitted from the drawing). A rotor 13 is inserted on the inner side of the stator 12 in a state such that there is a predetermined gap between the rotor 13 and the stator 12.

The rotor 13 is also formed by stacking silicon steel plates. Although the embodiment is such that iron cores wherein silicon steel plates are stacked are adopted as fixed side and rotating side iron cores, there is also a case wherein a magnetic material other than a silicon steel plate is used. Alternatively, there is also a case wherein an iron core is configured by cutting or combining simple blocks of a magnetic material such as iron. A shaft 14 whose center is formed of iron or the like penetrates the rotor 13. Ideally, a central axis 14a of the shaft 14 forms a central axis of rotation of the rotor 13. Further, the shaft 14 is supported by a shield 16, provided at both the front and back ends of the frame 11, via a bearing 15 formed of bearing steel or the like.

(First Embodiment)

Figure 2:
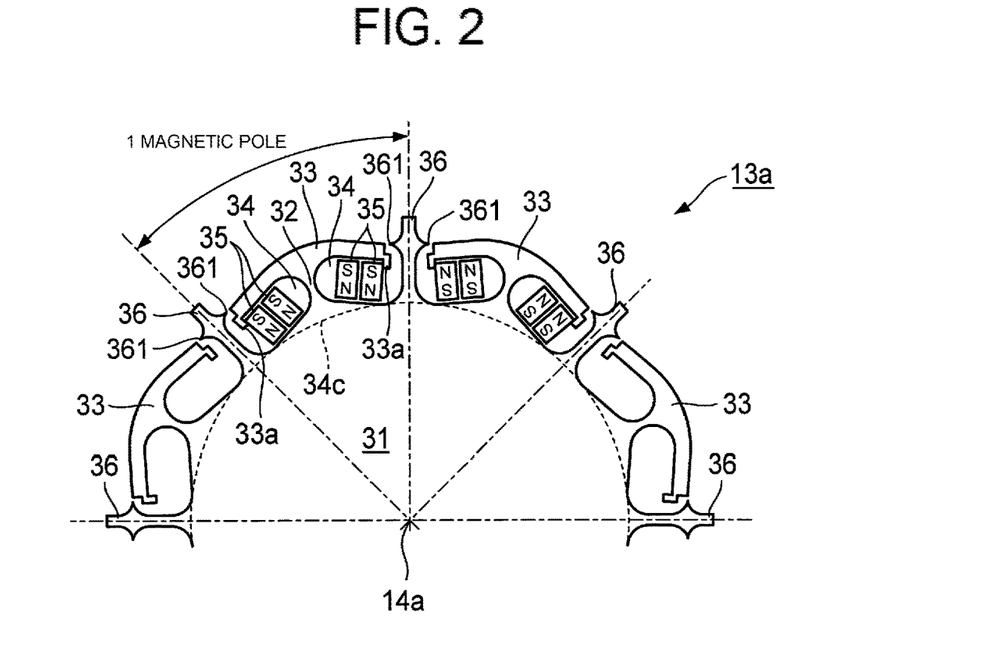
FIG. 2 is a lateral sectional view showing a configuration of a rotor of a permanent magnet embedded type rotating electrical machine, which is a first embodiment of the invention.

FIG. 2 is a lateral sectional view showing a configuration of a rotor 13a of a permanent magnet embedded type rotating electrical machine according to a first embodiment of the invention cut along a plane perpendicular to the shaft 14. The rotor 13a in this embodiment can be broadly divided into a core portion 31 to the central axis of rotation 14a side, a center bridge 32 extending from the core portion 31 to an outer side in a radial direction, an umbrella form portion 33 positioned on the outer side in the radial direction as seen from the center bridge 32, two communication holes 34 forming a pair, opened on either side of the center bridge 32, in bilateral symmetry with a central line of the center bridge 32 as the axis of symmetry and communicating with the rotor outer peripheral surface, magnets 35 disposed two in each communication hole, and a radiating projection 36 disposed at an intermediate position between two umbrella form portions 33 and extending in length radially from the core portion 31.

The umbrella form portion 33 has an approximately arc-form cross-section, and is connected to the core portion 31 via the center bridge 32. The outer peripheral surface of the umbrella form portion 33 has a radius of curvature smaller than the distance from the central axis of rotation 14a to the outermost peripheral portion of the rotor. The radius of curvature of one portion of the umbrella form portion 33, rather than that of the whole of the umbrella form portion 33 as heretofore described, may be smaller than the distance from the central axis of rotation 14a to the outermost peripheral portion of the rotor. Also, it is not necessary that the outer peripheral surface of the umbrella form portion 33 is a curved surface, provided that the distance from the rotational center of the rotor of the outer peripheral surface of the umbrella form portion 33 positioned on an extension of a straight line that passes through the center bridge 32 as seen from the rotational center of the rotor is longer than that of the outer peripheral surface in another position. In this way, by increasing the magnetic resistance of the center bridge 32, and reducing the magnetic resistance of the stator disposed on the outer periphery of the rotor and of the umbrella form portion 33, the torque of the permanent magnet embedded type rotating electrical machine can be increased.

One pair of communication holes 34 is disposed in a reverse V-shape when seen with the central axis of rotation 14a below. Also, the communication holes 34 communicate with the rotor outer periphery on a side opposite to that of the center bridge 32, that is, via a gap in the vicinity of the radiating projection 36. Further, a region (the core portion 31) on the central axis of rotation 14a side of the inner peripheral walls of the communication holes 34 inclines further in a direction away from the central axis of rotation 14a as the region moves toward the neighboring center bridge 32. Therefore, the center bridge 32 is placed in a position distanced to the outer side in the rotor 13a radial direction from an inscribed circle 34c of all the communication holes 34.

A positioning projection 33a that restricts movement of the magnet 35 to the radiating projection 36 side is provided on either side in the rotor rotation direction of the umbrella form portion 33. The positioning projection 33a protrudes toward the central axis of rotation 14a in a region of the inner wall of the communication hole 34 on the outer side in the rotor 13a radial direction as seen from the magnet 35, that is, in an end portion on the radiating projection 36 side on the inner side of the umbrella form portion 33. The magnet 35 is pressed against the positioning projection 33a, and thereby fixed inside the communication hole 34.

At this time, an adhesive is used in order to aid in the fixing of the magnet 35 in the communication hole 34. Alternatively, the magnet 35 may be fixed using a filler or the like so as not to move inside the communication hole 34.

The radiating projection 36 protrudes in a direction away from the central axis of rotation 14a in a central position between neighboring umbrella form portions 33. A chevron form side surface projection 361, an apex portion of which faces a corner portion of the outer peripheral surface of the umbrella form portion 33 on either side of the radiating projection 36, is formed on a side surface on either side in the rotor rotation direction of the radiating projection 36.

The above is the configuration of this embodiment.

In this embodiment, the outer peripheral surface of the rotor is such that, despite having a small break, the umbrella form portion 33 and the band form radiating projection 36 are more or less smoothly connected, meaning that air flow deviation is unlikely to occur. Consequently, according to this embodiment, windage loss can be reduced.

A chamfered form is created on a corner of an outermost peripheral portion of the band form radiating projection 36, preventing air flow deviation from occurring in this portion too. Also, as only very small portions of the side surface projection 361 and umbrella form portion 33 are in proximity, magnetic flux leakage in these portions is slight.

Also, as an advantage of this embodiment, there is an advantage owing to the form of the umbrella form portion 33.

When unevenness is provided in the outer peripheral surface of the rotor 13a, a higher harmonic component of torque generated can be converted to a fundamental wave component, whereby torque ripple can be reduced and output torque increased. Meanwhile, it is widely known that when force is applied to the uneven portion, locally high stress is generated due to a phenomenon called stress concentration.

Generally, in the case of a rotor wherein no communication hole communicates with the outer periphery of the rotor and the outer periphery is connected in a ring form, as in a widely used permanent magnet motor, assembly residual stress remains in the ring-form region in the vicinity of the outer peripheral surface of the rotor. Therefore, the rotor in a general motor is such that it is difficult to provide unevenness that leads to stress concentration in the outer peripheral surface of the rotor in which this kind of residual stress remains.

In this embodiment, however, the communication hole 34 is caused to communicate with the outer periphery of the rotor, because of which no residual stress remains in the umbrella form portion 33, which is an outer peripheral region of the rotor 13a. Consequently, in this embodiment, it is easy to provide unevenness in the outer peripheral region of the rotor 13a in order to increase torque.

Therefore, in this embodiment, the radius of curvature of the outer peripheral surface of the umbrella form portion 33, which is on the outer side of the permanent magnet 35 as seen from the central axis of rotation 14a, is smaller than the distance from the central axis of rotation 14a to the outermost peripheral portion of the rotor 13a. In this way, in this embodiment, torque ripple generated in the rotor 13a can be reduced and output torque increased, without increasing the generation of stress.

Also, as a characteristic of this embodiment, there are the communication holes 34 arrayed in a reverse V-shape. A description of advantages obtained from this characteristic is as follows.

Firstly, in the process of interference fitting the rotor 13a into the shaft, tensile stress remains in the rotor rotation direction in the rotor steel material. This residual stress barely occurs other than in a portion connected in a ring form with no break centered on the axis of rotation. Consequently, the form of the rotor 13a in this embodiment is such that hardly any assembly residual stress remains further outward in the rotor 13a radial direction than the inscribed circle 34c of the communication holes 34. Meanwhile, tensile stress (centrifugal stress) caused by centrifugal force is generated centered on the center bridge 32 when the rotor 13a rotates. When the communication holes 34 are arrayed in a reverse V-shape, the center bridge 32 can be disposed further outward in the rotor 13a radial direction than the inside of the inscribed circle 34c, where residual stress mainly occurs.

In this way, according to this embodiment, the inscribed circle 34c, where residual stress caused by the interference fit process mainly occurs, and the center bridge 32 in which centrifugal stress is generated when the rotor 13a rotates can be disposed apart. Therefore, stress generated in each of the inscribed circle 34c and the center bridge 32 can be restricted.

Also, in this embodiment, the positioning projection 33a is provided in the umbrella form portion 33 on the outer side in the radial direction as seen from the magnet 35. Consequently, by the magnet 35 being pressed against and fixed by the positioning projection 33a, imbalance in centrifugal force generated in the four magnets 35 forming two pairs can be prevented, and imbalance in the distribution of magnetic flux generated by the magnets 35 can be prevented.

Although there is a method whereby a positioning projection is provided in rotor steel material on the inner side in a radial direction as seen from a magnet, as in an existing example, there is a problem in using this method when the communication holes are disposed in a reverse V-shape. This is because the positioning projection is provided near a range in which assembly residual stress occurs. When a positioning projection is provided, a depression is provided at the same time in the surface of the rotor steel material on the inner side in the radial direction as seen from the magnet. Stress concentration is essentially liable to occur in the depression. In this case, provided that chamfering of the depressed portion in the outer peripheral surface of the rotor steel material on the inner side in the radial direction can be carried out by increasing a chamfer radius, the stress concentration can be relaxed to an extent. However, as a chamfer radius such that stress can be sufficiently relaxed is often equivalent to, or greater than, the thickness of the magnet, this kind of chamfered depressed portion does not fulfill the positioning function. Therefore, providing a positioning projection in rotor steel material on the inner side in a radial direction as seen from a magnet, as in the existing example, is not desirable, as the strength of the positioning projection with respect to assembly residual force is reduced.

(Second Embodiment)

Figure 3:
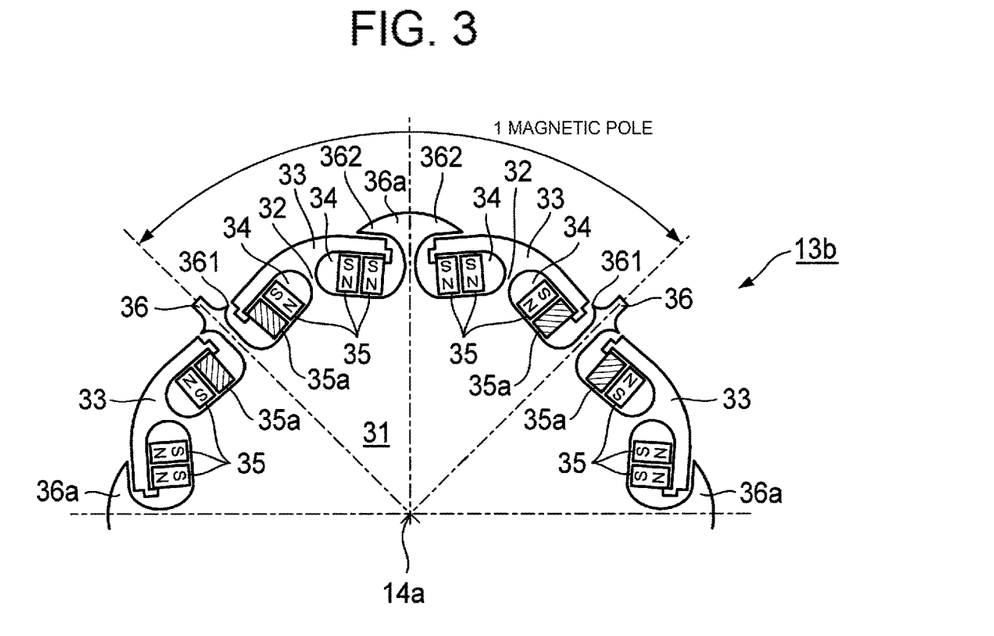
FIG. 3 is a lateral sectional view showing a configuration of a rotor of a permanent magnet embedded type rotating electrical machine, which is a second embodiment of the invention.

FIG. 3 is a sectional view showing a configuration of a rotor 13b of a permanent magnet embedded type rotating electrical machine, which is a second embodiment of the invention. The same reference signs are used for portions in this drawing corresponding to portions shown in FIG. 2.

The rotor 13b in this embodiment is such that one magnetic pole is configured of two center bridges 32, two umbrella form portions 33, six magnets 35, two weights 35a, two band form radiating projections 36 positioned in the vicinity of a boundary between magnetic poles, one radiating projection 36a positioned in the vicinity of the center of the magnetic pole, and the like. Further, in the example shown in FIG. 3, four magnetic poles are configured in the whole of the rotor 13b.

Of the three radiating projections, the two radiating projections 36 on either side in the rotor rotation direction are of the same form as the band form radiating projection 36 of the first embodiment (refer to FIG. 2). Also, of the three radiating projections, the central radiating projection 36a is of an umbrella form. Hereafter, therefore, the radiating projection 36a in the center in the rotor rotation direction is referred to as the umbrella form radiating projection 36a. The umbrella form radiating projection 36a has a side surface projection 362 that covers one portion or the whole of the two umbrella form portions 33 on either side in the rotor rotation direction from the outer peripheral side of the rotor. As opposed to this, the two radiating projections 36 have the chevron form side surface projection 361, but the side surface projection 361 is distanced in the rotor rotation direction from an end portion of the umbrella form portion 33. That is, in this embodiment, distances in the rotor rotation direction from the umbrella form portions 33 differ among the multiple radiating projections, and the distance between the umbrella form radiating projection 36a positioned in the center of the magnetic pole and the umbrella form portion 33 is shorter than the distance between the band form radiating projection 36 positioned on the boundary between magnetic poles and the umbrella form portion 33.

Also, in this embodiment, the width of a portion of the umbrella form radiating projection 36a positioned in the center of the magnetic pole on the inner side in the rotor radial direction of the side surface projection 362 (a dimension in the rotor rotation direction) is smaller than the width of the band form radiating projection 36 on either side in the rotor rotation direction.

Also, in this embodiment, the distance between the outermost periphery of the umbrella form radiating projection 36a positioned in the center of the magnetic pole and the central axis of rotation 14a is longer than the distance between the outermost periphery of the umbrella form portion 33 and the central axis of rotation 14a. That is, the outermost periphery of the umbrella form radiating projection 36a is nearer to the stator 12 than the outermost periphery of the umbrella form portion 33.

The above is the configuration of this embodiment.

According to this embodiment, the outer peripheral surface of the rotor is such that the umbrella form portion 33 and the radiating projections 36 and 36a having the side surface projections 361 and 362 respectively are more or less smoothly connected, meaning that air flow deviation is unlikely to occur. Consequently, according to this embodiment, windage loss can be reduced as in the first embodiment.

Also, according to this embodiment, the number of magnetic poles in the rotor 13b can be reduced. Hereafter, advantages of this will be described.

(1) Firstly, in this embodiment, the umbrella form radiating projection 36a in the center of the magnetic pole covers a wide range of the umbrella form portion 33 on either side in the rotor rotation direction of the umbrella form radiating projection 36a, and the distance from the umbrella form portion 33 is short. Therefore, in this embodiment, the magnetic resistance between the umbrella form radiating projection 36a in the center of the magnetic pole and the two umbrella form portions 33 is low.

(2) Also, the umbrella form radiating projection 36a in the center of the magnetic pole is nearer than the umbrella form portion 33 to the stator, and the magnetic resistance between the umbrella form radiating projection 36a and the stator is low. Therefore, in this embodiment, magnetic flux easily passes through the center of the magnetic pole where the umbrella form radiating projection 36a exists.

(3) Also, the width of a portion of the umbrella form radiating projection 36a in the vicinity of the radial direction center is small. Therefore, in this embodiment, magnetic short-circuiting with the umbrella form radiating projection 36a as a path is unlikely to occur.

(4) Also, in this embodiment, of the eight magnets 35 within the range of two magnetic poles (the range of one magnetic pole in this embodiment) in the first embodiment (refer to FIG. 2), the two magnets 35 on either side in the rotor rotation direction are replaced with the weight 35a, which does not have magnetomotive force, and magnetomotive force in the vicinity of the umbrella form radiating projection 36a is high. Therefore, magnetomotive force distribution close to one sine wave is obtained within the range of two magnetic poles (the range of one magnetic pole in this embodiment) in the first embodiment (refer to FIG. 2).

In this embodiment, owing to the advantages of (1) to (4), a range corresponding to two magnetic poles in the first embodiment (refer to FIG. 2) is adopted as one magnetic pole, and the number of magnetic poles in the whole of the rotor can be reduced by half. Therefore, it is sufficient that a control speed of an inverter that drives a permanent magnet embedded type rotating electrical machine is one-half of that in the first embodiment.

In this way, according to this embodiment, the total number of magnetic poles in the rotor can be reduced by half without reducing output torque by half. Further, as the total number of magnetic poles in the rotor can be reduced by half without reducing output torque by half, power supply frequency supplied can be reduced by half without reducing motor performance by half. Further, as the power supply frequency supplied can be reduced by half, a low-priced inverter that does not have especially good high speed control performance can be selected as, for example, a power supply inverter. Alternatively, when using an inverter with superior high speed control performance as usual, this embodiment can contribute to a further increase in rotation speed.

The total value of magnetomotive force can be returned to the original value by returning the portions replaced by weights to magnets. Also, the weights can also be eliminated. In this case, the centrifugal force acting on the center bridge 32 is bilaterally asymmetrical. In this case, however, the center bridge 32 can be prevented from becoming insufficiently strong by employing a measure such as arranging so that the umbrella form portion 33 is bilaterally asymmetrical.

(Third Embodiment)

Figure 4:
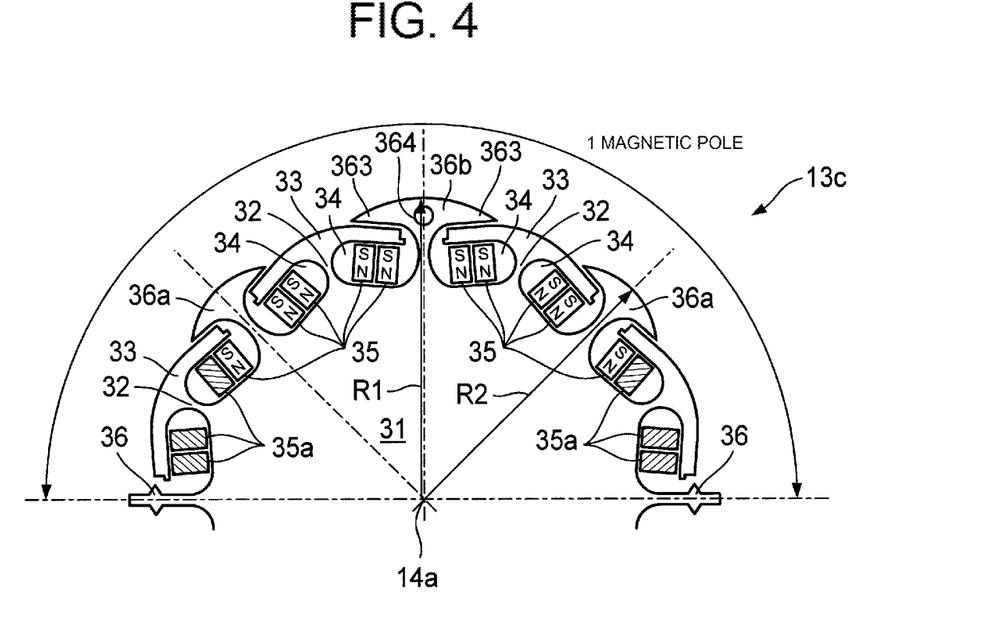
FIG. 4 is a lateral sectional view showing a configuration of a rotor of a permanent magnet embedded type rotating electrical machine, which is a third embodiment of the invention.

FIG. 4 is a sectional view showing a configuration of a rotor 13c of a permanent magnet embedded type rotating electrical machine, which is a third embodiment of the invention. The same reference signs are used for portions in this drawing corresponding to portions shown in FIG. 2 and FIG. 3.

The rotor 13c in this embodiment is such that one magnetic pole is configured of four center bridges 32, four umbrella form portions 33, ten magnets 35, six weights 35a, two band form radiating projections 36 positioned on boundaries between magnetic poles, two radiating projections 36a on inner sides in the rotor rotation direction of the two radiating projections 36, one radiating projection 36b positioned in the center of the magnetic pole on the inner sides of the two radiating projections 36, and the like. Further, in the example shown in the drawing, two magnetic poles are configured in the whole of the rotor.

Of the five radiating projections, the two radiating projections 36 on either side are of the same form as the radiating projection 36 of the first embodiment (refer to FIG. 2). The two radiating projections 36a on inner sides in the rotor rotation direction of the two radiating projections 36 are umbrella form radiating projections having the same form as the umbrella form radiating projection 36a of the second embodiment (FIG. 3). The radiating projection 36b positioned in the center of the magnetic pole between the two radiating projections 36a, in the same way as the umbrella form radiating projection 36a, has a side surface projection 363 that covers one portion or the whole of the umbrella form portion 33 from the outer peripheral side of the rotor, but in addition to this, the radiating projection 36b has a hole 364 for reducing weight. By the hole 364 being provided, centrifugal force acting on the umbrella form radiating projection 36b can be reduced.

Also, in FIG. 4, a distance R1 between the outermost periphery of the umbrella form radiating projection 36b positioned in the center of the magnetic pole and the central axis of rotation 14a is longer than a distance R2 between the outermost periphery of the umbrella form radiating projection 36a, located at an intermediate position between a boundary between magnetic poles and the center of the magnetic pole, and the central axis of rotation 14a. Consequently, the umbrella form radiating projection 36b positioned in the center of the magnetic pole is nearer to the stator 12 than the umbrella form radiating projections 36a on either side of the umbrella form radiating projection 36b.

Also, of the sixteen magnets 35 of the four magnetic poles in the first embodiment (refer to FIG. 2), the six magnets 35 at either end are replaced with the weight 35a.

According to this embodiment, owing to the heretofore described characteristics, the number of magnetic poles can be further reduced by half from that in the second embodiment (refer to FIG. 3), and magnetomotive force distribution can be close to a sine wave within the range of one magnetic pole (the range of four magnetic poles in the first embodiment). Also, in this embodiment, the weight reducing hole 364 is disposed in a central portion of the most centrally disposed umbrella form radiating projection 36b, because of which centrifugal force acting on the umbrella form radiating projection 36b can be reduced. Consequently, the width of a portion on the inner side in the rotor radial direction of the side surface projection 363 in the umbrella form radiating projection 36b can be sufficiently reduced, whereby leakage flux between the umbrella form radiating projection 36b and core portion 31 can be reduced.

(Fourth Embodiment)

Figure 5:
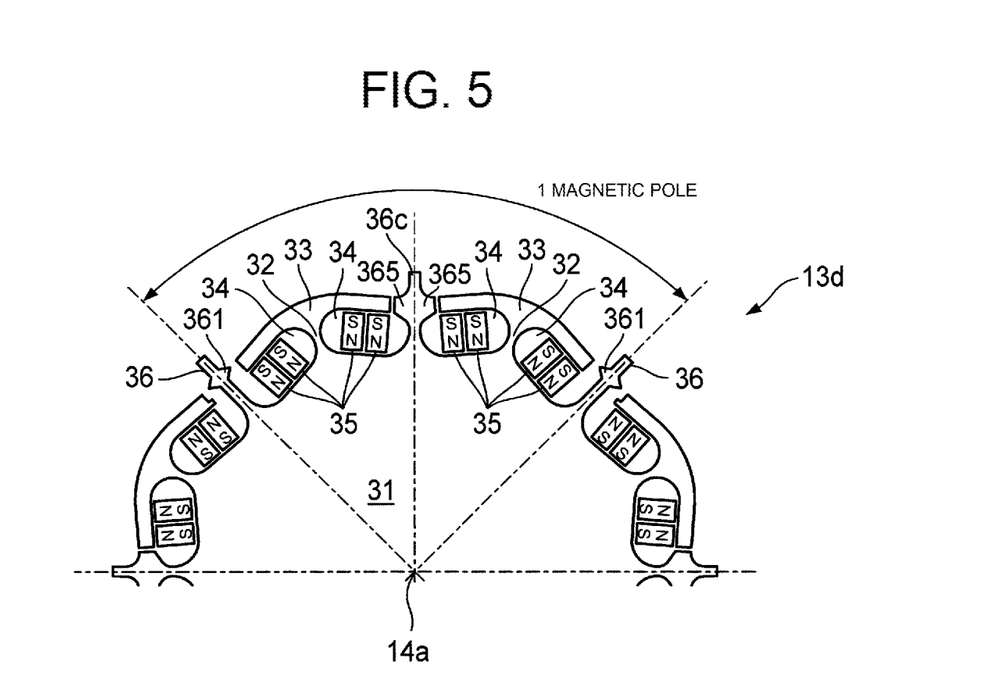
FIG. 5 is a lateral sectional view showing a configuration of a rotor of a permanent magnet embedded type rotating electrical machine, which is a fourth embodiment of the invention.

FIG. 5 is a sectional view showing a configuration of a rotor 13d of a permanent magnet embedded type rotating electrical machine, which is a fourth embodiment of the invention. The same reference signs are used for portions in this drawing corresponding to portions shown in FIG. 2.

The rotor 13d in this embodiment is such that one magnetic pole is configured of two center bridges 32, two umbrella form portions 33, eight magnets 35, two radiating projections 36 positioned on a boundary between magnetic poles, one radiating projection 36c positioned in the center of the magnetic pole, and the like. Further, in the example shown in the drawing, four magnetic poles are configured in the whole of the rotor 13d. Of the three radiating projections, the two radiating projections 36 on either side are of the same form as the radiating projection 36 of the first embodiment (refer to FIG. 2). The radiating projection 36c in the center of the magnetic pole sandwiched between the two radiating projections 36 has a side surface projection 365 having a trapezoidal sectional form whose planar apex portion faces an end surface of an end portion in the rotor rotation direction of the umbrella form portion 33. An end surface of the side surface projection 365 protrudes farther to the inner side in the rotor radial direction than end surfaces on either side in the rotor rotation direction of the umbrella form portion 33, and the protruding side surface projection 365 functions as a positioning projection that restricts movement of the magnet 35 to the radiating projection 36c side.

In this embodiment too, the same advantages as in the second embodiment are obtained.

(Other Embodiments)

Heretofore, a description has been given of first to fourth embodiments of the invention, but other embodiments of the invention are conceivable.

(1) The invention is applicable not only to a motor but also to a generator.

(2) A permanent magnet embedded type rotating electrical machine is described as an example in the heretofore described embodiments, but the invention is also applicable to a reluctance motor in which no magnet is used.

(3) In a reluctance motor too, it is not necessary that the outer peripheral surface of the umbrella form portion 33 is a curved surface. It is sufficient that the distance from the rotational center of the rotor of the outer peripheral surface of the umbrella form portion 33 positioned on an extension of a straight line that passes through the center bridge 32 as seen from the rotational center of the rotor is longer than that of the outer peripheral surface in another position. This form has an advantage of increasing torque in a reluctance motor.

(4) The number of magnets and weights disposed on either side of the center bridge, not being limited to four, may be two or six or more.

(5) As the invention is applicable regardless of magnet type, a neodymium magnet, a ferrite magnet, or the like, is of course applicable. Also, a quadrilateral form has been described as an example of the form of the magnet, but one portion or the whole of the magnet may be curved.

(6) In the heretofore described embodiments, eight is given as an example of the number of center bridges in the whole of the circumference, and in, for example, the first embodiment, a description is given of a case wherein one magnetic pole is configured of pairs of communication holes 34 and the center bridge 32, but the number of center bridges provided in the rotor may be four, twelve, or the like. That is, the number of center bridges 32 configuring one magnetic pole can be changed within a range that does not depart from the scope of the invention.

REFERENCE SIGNS LIST 13, 13a, 13b, 13c, 13d . . . Rotor, 31 . . . Core portion, 32 . . . Center bridge, 33 . . . Umbrella form portion, 36, 36a, 36b, 36c, 36d . . . Radiating projection, 361, 362, 363, 365 . . . Side surface projection, 34 . . . Communication hole, 35 . . . Magnet, 33a . . . Positioning projection, 14a . . . Central axis of rotation, 12 . . . Stator

What is claimed is:

1. A rotating electrical machine, comprising:
   a rotor having a core portion and a plurality of umbrella form portions; and
   a plurality of pairs of communication holes formed in the rotor in a rotor rotation direction, each pair including two communication holes, each communication hole communicating with an outer periphery of the rotor, wherein
   each of the umbrella form portions is connected to the core portion via a center bridge in a rotor radial direction, to thereby form one pair of the plurality of pairs of communication holes, each communication hole on one side of the center bridge,
   the rotor has a plurality of radiating projections protruding in the rotor radial direction from a rotational center of the rotor, each radiating projection between two adjacent pairs of the plurality of pairs of communication holes, and
   at least one of the plurality of radiating projections has a side surface projection protruding toward one of the umbrella form portions adjacent thereto in the rotor rotation direction, the side surface projection covering one portion or a whole of said one umbrella form portion from a rotor outer peripheral side.

2. The rotating electrical machine according to claim 1, wherein
   a radiating projection of the plurality of radiating projections has a hole.

3. The rotating electrical machine according to claim 1, wherein
   at least one of the side surface projections has a chevron sectional form of which an apex portion faces a corner portion on an outer side in the rotor radial direction of an end portion in the rotor rotation direction of one of the umbrella form portions adjacent thereto.

4. The rotating electrical machine according to claim 1, wherein
   the side surface projection has a trapezoidal sectional form of which a planar form apex portion faces an end surface of an end portion in the rotor rotation direction of the umbrella form portion.

5. The rotating electrical machine according to claim 1, wherein
the plurality of radiating projections are such that a third radiating projection, which has a side surface projection having a chevron sectional form of which an apex portion faces a corner portion on the outer side in the rotor radial direction of an end portion in the rotor rotation direction of the umbrella form portion, and a fourth radiating projection, which has a side surface projection having a trapezoidal sectional form of which a planar form apex portion faces an end surface of an end portion in the rotor rotation direction of the umbrella form portion, exist together.

6. The rotating electrical machine according to claim 1, wherein
the rotating electrical machine outputs only reluctance torque as torque.

7. The rotating electrical machine according to claim 1, wherein
a plurality of ones of the center bridges are included within a region equivalent to one magnetic pole in the rotor.

8. The rotating electrical machine according to claim 7, wherein
a magnet and a weight are caused to exist together in each communication hole of the plurality of communication hole pairs.

9. The rotating electrical machine according to claim 7, wherein
a magnet is embedded in a communication hole of the plurality of communication holes in a vicinity of a magnetic pole center, and a weight is embedded in the communication hole in a vicinity of a boundary between magnetic poles.

10. A rotating electrical machine, comprising:
a plurality of communication hole pairs, each communication hole pair including two communication holes that each communicate with an outer periphery of a rotor, and that are formed in the rotor in a rotor rotation direction, wherein
each pair of the plurality of communication hole pairs includes a region between the two communication holes configuring said each pair, the region including an umbrella form portion, and
a center bridge that connects the umbrella form portion to a core portion of the rotor in the rotor radial direction,
the two communication holes communicating with the outer periphery of the rotor on a side opposite to that of the center bridge,
the rotor has a plurality of radiating projections protruding in the rotor radial direction from a rotational center of the rotor between every two adjacent pairs of the plurality of communication hole pairs, at least one of the plurality of radiating projections having a side surface projection protruding toward one of the umbrella form portions adjacent thereto in the rotor rotation direction, and
the plurality of radiating projections include at least one first radiating projection and at least one second radiating projection, a form of each of the at least one first radiating projection differing from a form of each of the at least one second radiating projection.

11. The rotating electrical machine according to claim 10, wherein
widths in the rotor rotation direction of the plurality of radiating projections differ among the plurality of radiating projections.

12. The rotating electrical machine according to claim 10, wherein
a width of one of the plurality of radiating projections that is positioned in a magnetic pole center is smaller than a width of one of the plurality of radiating projections that is positioned on a boundary between magnetic poles.

13. The rotating electrical machine according to claim 10, wherein
respective distances between respective outermost peripheries of the plurality of radiating projections and the rotational center of the rotor differ among the plurality of radiating projections.

14. The rotating electrical machine according to claim 13, wherein
a distance between an outermost periphery of one of the radiating projections that is located at an intermediate position between a boundary between magnetic poles and a magnetic pole center and the rotational center of the rotor is smaller than a distance between an outermost periphery of another one of the radiating projections that is located in the magnetic pole center and the rotational center of the rotor.

15. The rotating electrical machine according to claim 10, wherein
a distance between each of the at least one first radiating projection and one of the umbrella form portions that is adjacent to said each first radiating projection differs from a distance between each of the at least one second radiating projection and one of the umbrella form portions that is adjacent to said each second radiating projection.

16. The rotating electrical machine according to claim 15, wherein
each of the at least one first radiating projection has the side surface projection and each of the at least one second radiating projection does not have the side surface projection.

17. The rotating electrical machine according to claim 15, wherein
the plurality of radiating projections include
a plurality of third radiating projections, which are ones of the plurality of radiating projections that are positioned in a magnetic pole center, and
a plurality of fourth radiating projections, which are ones of the plurality of radiating projections that are positioned on a boundary between magnetic poles, and
a distance between each of the third radiating projections and one of the umbrella form portions that is adjacent to said each third radiating projection is shorter than a distance between each of the fourth radiating projections and one of the umbrella form portions that is adjacent to said each fourth radiating projection.

18. The rotating electrical machine according to claim 17, wherein
each of the third radiating projections has a side surface projection that covers one portion or a whole of one of the umbrella form portions that is adjacent to said each third radiating projection.

19. A rotating electrical machine, comprising:
a plurality of communication hole pairs, each communication hole pair including two communication holes that each communicate with an outer periphery of a rotor, and that are formed in the rotor in a rotor rotation direction, wherein each pair of the plurality of communication hole pairs includes a region between the two communication holes configuring said each pair, the region including an umbrella form portion, and a center bridge that connects the umbrella form portion to a core portion of the rotor in the rotor radial direction, the two communication holes communicating with the outer periphery of the rotor on a side opposite to that of the center bridge, the rotor has a plurality of radiating projections protruding in the rotor radial direction from a rotational center of the rotor between every two adjacent pairs of the plurality of communication hole pairs, at least one of the plurality of radiating projections having a side surface projection protruding toward one of the umbrella form portions adjacent thereto in the rotor rotation direction, and the plurality of radiating projections include a plurality of first radiating projections and a plurality of second radiating projections that exist together, each first radiating projection having a first side surface projection of a chevron sectional form of which an apex portion faces a corner portion on an outer side in the rotor radial direction of an end portion in the rotor rotation direction of one of the umbrella form portions adjacent to said each first radiating projection, and each second radiating projection having a second side surface projection that covers one portion or a whole of one of the umbrella form portions adjacent to said each second radiating projection from a rotor outer peripheral side.

20. The rotating electrical machine according to claim 19, wherein the plurality of first radiating projections are arrayed in the rotor rotation direction sandwiching at least one of the second radiating projections.

21. The rotating electrical machine according to claim 19, wherein on an inner side in the rotor radial direction, a width of each of the second radiating projections is smaller than a width of each of the first radiating projections.

22. The rotating electrical machine according to claim 21, wherein a distance between an outermost periphery of one of the second radiating projections that is positioned in a magnetic pole center and a rotor rotation center is greater than a distance between an outermost periphery of each of the umbrella form portions and the rotor rotation center.

23. The rotating electrical machine according to claim 22, wherein a plurality of the third radiating projections are arrayed in the rotor rotation direction sandwiching at least one of the plurality of the fourth radiating projections.

24. A rotor, comprising:

a core portion; and a plurality of radial projections and a plurality of umbrella-form portions extending from the core portion, each of the radial projections being separated from another of the radial projections by one of the umbrella-form portions, and each of the umbrella-form portions forming an outer wall of a communication hole pair on an outer periphery of the rotor, the communication hole pair being configured to hold at least one magnet, wherein each of the radial projections extends beyond ones of the umbrella-form portions that are adjacent to said each radial projection in a radial direction, and at least one of the radial projections has a side projection that projects over one of the umbrella-form portions that is adjacent to said at least one radial projection from a side of the outer periphery of the rotor.

\* \* \* \* \*